United States Patent [19]

Phillips

[11] Patent Number: 5,288,400

[45] Date of Patent: Feb. 22, 1994

[54] BIOLOGICAL FILTRATION SYSTEM

[75] Inventor: Rodney A. Phillips, Indianapolis, Ind.

[73] Assignee: Theodore J. Wichman, Indianapolis, Ind. ; a part interest

[21] Appl. No.: 986,627

[22] Filed: Dec. 4, 1992

[51] Int. Cl.⁵ ............................................. C02F 3/02
[52] U.S. Cl. ................................. 210/151; 210/169; 210/195.1; 210/202; 210/220; 210/259; 210/295
[58] Field of Search ............... 210/150, 151, 169, 220, 210/221.2, 259, 195.1, 295, 202

[56] References Cited

U.S. PATENT DOCUMENTS

| | | | |
|---|---|---|---|
| 2,992,986 | 7/1961 | Ingram | 210/150 |
| 3,661,262 | 5/1972 | Sanders | 210/169 |
| 3,669,883 | 6/1972 | Huckstedt et al. | 210/169 |
| 3,957,634 | 5/1976 | Orensten et al. | 210/169 |
| 4,295,965 | 10/1981 | Koster | 210/169 |
| 4,311,588 | 1/1982 | Tunze | 210/169 |
| 4,427,548 | 1/1984 | Quick, Jr. | 210/169 |
| 4,894,149 | 1/1990 | Block | 210/169 |
| 4,915,828 | 4/1990 | Meyers | 210/169 |
| 4,988,436 | 1/1991 | Cole | 210/169 |
| 5,081,954 | 1/1992 | Monus | 210/169 |
| 5,084,164 | 1/1992 | Del Rosario | 210/169 |
| 5,108,594 | 4/1992 | Giovanetti et al. | 210/169 |
| 5,116,489 | 5/1992 | Englert | 210/169 |
| 5,139,656 | 8/1992 | Gonnello | 210/169 |
| 5,176,824 | 1/1993 | Willinger et al. | 210/169 |
| 5,178,758 | 1/1993 | Hwang | 210/169 |
| 5,232,582 | 8/1993 | Takahashi et al. | 210/169 |

OTHER PUBLICATIONS

H. J. Mayland, "The complete Home Aquarium", Grosset & Dunlap Publishers, New York, pp. 15-22, date unknown.

M. A. Moe, Jr., "The Marine Aquarium Reference-Systems and Invertebrates", Green Turtle Publications, pp. 170-187, 1989.

M. A. Moe, Jr., "The Marine Aquarium Reference-Systems and Invertebrates", Green Turtle Publications, pp. 90-95, 1989.

*Primary Examiner*—Stanley S. Silverman
*Assistant Examiner*—Cynthia L. Nessler
*Attorney, Agent, or Firm*—Barnes & Thornburg

[57] ABSTRACT

A biological filtration system is provided for filtering a water supply. The filtration system includes a micron filter having an input and an output. Water is supplied from the water supply to the input of the micron filter. The filtration system also includes a canister filled with a biomedia material. The canister has an inlet end coupled to the output of the micron filter and an outlet end. Air is injected into the inlet end of the canister. Water from the outlet end of the canister is returned to the water supply.

11 Claims, 3 Drawing Sheets

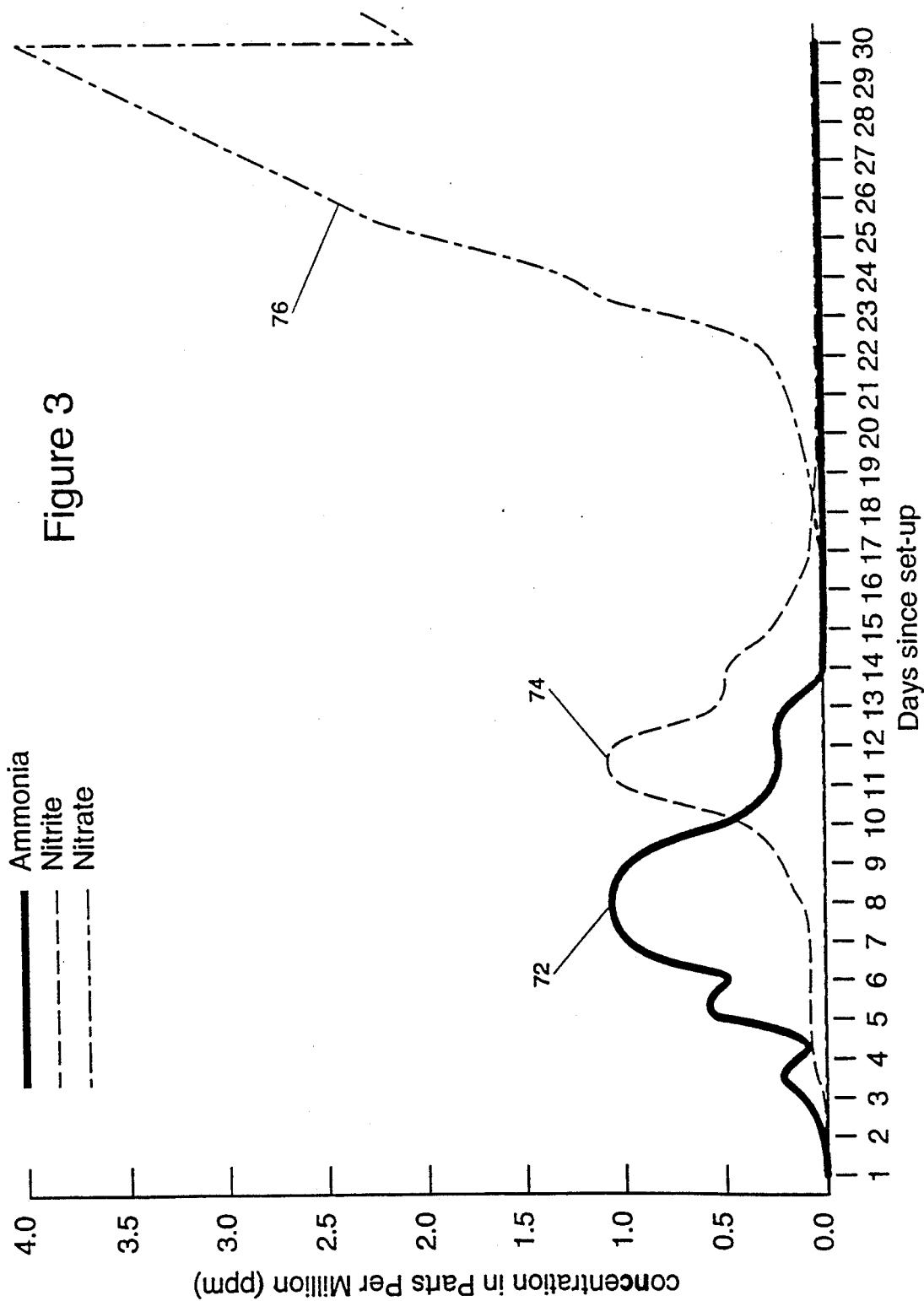

BIOLOGICAL FILTRATION SYSTEM

BACKGROUND AND SUMMARY OF THE INVENTION

The present invention relates to a biological filtration system for removing ammonia and nitrite from a water supply. More particularly, the present invention relates to a biological filtration system which improves the efficiency of the nitrification process of water passing through the filtration system.

Although the preferred embodiment of the present invention is disclosed with regard to filtering a water supply in a closed system such as an aquarium, it is understood that the present invention can be used for filtering other water supplies. In particular, by scaling of the sizes of the components of the biological filtration system of the present invention, the filtration system may be used to filter a municipal water supply or a water supply drawn from a well or reservoir.

Ammonia ($NH_3$) or $(NH_3)^{+4}$ depending upon the pH of water is a chemical compound that is very toxic. In a closed water supply system with a finite amount of water, such as in an aquarium, the ammonia level in the water can build up to toxic levels very rapidly. Ammonia builds up in the water supply from two sources. A first source of ammonia is animals which consume plant protein. This plant protein is broken down and excreted as urea, uric acid, or ammonia. Both urea and uric acid are quickly converted by bacteria into ammonia. A second source of ammonia is the break down of proteins and other nitrogen containing organic compounds by heterotrophic bacteria in a process called mineralization. Ammonia is a nonorganic compound which results from mineralization.

High levels of ammonia deplete oxygen through process of diffusion. Biological filtration is used to combat the problem of ammonia build up in the closed environment of an aquarium. Biological filtration is a process by which bacteria oxidize ammonia into a less toxic form. Oxidation of ammonia occurs in a two step process. In the first step, ammonia is oxidized by nitrifying bacteria in the genus Nitrosomonas or other related genera into nitrite ($NO_2$). Nitrite is less harmful than ammonia but can still be dangerous in quantities greater than one part per million. Nitrite is further oxidized by nitrifying bacteria in the genus Nitrobacter or other related genera to form nitrate ($NO_3$). Nitrate is diluted from closed system through periodic water changes.

Various types of biological filters are known. Wet/dry filtration systems work by running water over a vast surface area, usually a tray containing biomedia with water dripping over it. Nitrifying bacteria grow on the surface area of the biomedia. These filtration systems therefore provide a large surface area for nitrifying bacteria to grow and greater water surface coverage for the exchange of gases.

One known biological filter is a trickle filter. In a conventional trickle filter, water passes through a trickle section of the filter and takes on dissolved gases by diffusion. Water draining from the aquarium is coarsely prefiltered to keep out large chunks of detritus such as dead fish, snails, etc. Typically, the water passes over biomedia. Biomedia having a large surface area is commonly available. A standard formula for conventional trickle filters is that biomedia having a volume equal to about 10% of the total volume in the tank must be used in the trickle filter. For example, a trickle filter servicing a 55 gallon tank would need 5.5 gallon of biomedia. Commercial designs for trickle filters include a translucent or semi-translucent compartment for the biomedia. Therefore, owners can watch the water pass through the trickle filter. Most commercial designs for trickle filters use containers that tend to be short and fat in ratio. The water passing through the trickle filter tends to take the path of least resistance and "channels" through the biomedia in the trickle filter. This causes the water to miss entire areas of the biomedia, thereby reducing the overall efficiency of the filter.

An object of the present invention is to improve the efficiency of the nitrification process to reduce the amount of ammonia and nitrite present in a water supply.

Anther object of the present invention is to provide separate locations for the growth of heterotrophic bacteria colonies and for the growth of nitrifying bacteria colonies to provide an optimum environment for nitrifying bacteria to oxidize ammonia into nitrite and then into nitrate.

Yet another object of the present invention is to maintain saturated oxygen levels within a water supply while minimizing the amount of ammonia and nitrate in the water supply.

In the biological filtration system of the present invention, water is pumped from the water supply into a micron filter. The micron filter filters particles having a size larger than one micron (1/1000 of an inch) from the water. After passing through the micron filter, water proceeds to an array of filter canisters. Water passes through spray nozzles which spray the water into an inlet end of the canisters. The spray nozzles break up the water and mix it with air which is supplied to the inlet end of the canisters. Water hits biomedia stored in the array of canisters. Any commercially available biomedia or any other inert substance which has a large surface area on which bacteria can grow may be used in the canisters. Water passes over the biomedia and is further mixed with air. At the bottom of the canisters, the water is collected and passed through a tube back into the water supply.

The spray nozzles disperse the water over a larger area of the biomedia to reduce channeling as the water passes over the biomedia in the canisters. In addition, the air supply to the top of the canisters from the air pump increases the atmospheric pressure around the biomedia so that dissolved gases are forced into the water to the point of super-saturation. Because water passing through the biomedia is prefiltered to remove particles greater than one micron from the water, the filtration system of the present invention promotes substantially separate environments for the growth of heterotrophic bacteria colonies and nitrifying bacteria colonies. Heterotrophic bacteria are attracted to the food supply provided by the organic material trapped in the micron filter. Heterotrophic bacteria feeds on the organic detritus trapped in the micron filter. Nitrifying bacteria grow on the biomedia in the array of canisters. There is a negligible food supply for heterotrophic bacteria in the array of canisters. Therefore, the biological filtration system of the present invention provides an optimum environment for nitrifying bacteria colonies to grow by eliminating competition with heterotrophic bacteria that feed on organic detritus.

The present invention requires biomedia equal to only 1% to 3% of the total tank volume. Therefore, for a 55 gallon tank, the present invention requires only ½ to 1½ gallons of biomedia. The canisters for holding the biomedia in the present invention are preferably completely opaque. Heterotrophic bacteria growth is partially light dependent. Therefore, the darkness inside the canisters further discourages competition between heterotrophic bacteria and nitrifying bacteria. The canisters are relatively tall and thin in ratio compared to commercially available trickle filters. This further reduces the likelihood that channeling will occur as water passes over the biomedia located in the canisters.

According to one aspect of the present invention, a biological filtration system is provided for filtering a water supply. The filtration system includes a micron filter having an input and an output, and means for supplying water from the water supply to the input of the micron filter. The filtration system also includes a canister filled with a biomedia material. The canister has an inlet end coupled to the output of the micron filter and an outlet end. The filtration system further includes means for injecting air into the inlet end of the canister, and means for returning water from the outlet end of the canister to the water supply.

In one embodiment of the invention, the means for supplying water from the water supply to the input of the micron filter comprises a canister filter. The canister filter filters the water and pumps the water from the water supply through the canister filter to the input of the micron filter.

According to another aspect of the present invention, a biological filtration system is provided for filtering a water supply. The filtration system includes an elongated canister having an opaque outer wall defining an interior region which contains biomedia material therein. The canister has an inlet end and an outlet end. The filtration system also includes means for supplying water from the water supply to the inlet end of the canister. The supplying means includes a spray nozzle located adjacent the inlet end of the canister for dispersing the water entering the inlet end of the canister so that water flows substantially evenly over the biomedia inside the canister. The filtration system further includes means for supplying air into the inlet end of the canister so that air mixes with the dispersed water from the spray nozzle, and means for returning water from the outlet end of the canister to the water supply.

In an illustrated embodiment, the canister has a generally cylindrical shape. The filtration system may include an array of canisters to increase the capacity of the filtration system.

According to yet another aspect of the invention, a biological filtration system is provided for filtering a water supply. The biological filtration system reduces the quantity of ammonia and nitrite in the water supply. The filtration system includes means for separating heterotrophic bacteria colonies from nitrifying bacteria colonies, and means for supplying water from the water supply to the separating means. The filtration system also includes a canister filled with a biomedia material for promoting growth of nitrifying bacteria. The canister has an inlet end coupled to the outlet of the separating means so that water from the separating means flows through the canister and an outlet end. The filtration system further includes means for injecting air into the inlet end of the canister to provide oxygen for promoting oxidation of ammonia and nitrite by the nitrifying bacteria growing on the biomedia in the canister. The filtration system still further includes means for returning water from the outlet end of the canister to the water supply.

In the illustrated embodiment, the separating means includes a micron filter having an input and an output. The micron filter traps detritus and heterotrophic bacteria entrained in the water inside the micron filter to promote growth of heterotrophic bacteria colonies inside the micron filter instead of in the canisters. The micron filter includes a removable micron filter cartridge so that the detritus and heterotrophic bacteria in the micron filter cartridge can be removed from the water supply, thereby reducing the content of heterotrophic bacteria in the water supply. Therefore, in the illustrated embodiment, the removable micron filter cartridge provides means for removing detritus from the water supply to reduce the quantity of ammonia in the water supply.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 3 is a chart illustrating the concentration of ammonia, nitrite, and nitrate in a 60 gallon tank equipped with the biological filtration system of the present invention.

DETAILED DESCRIPTION OF THE DRAWINGS

Figure 1:
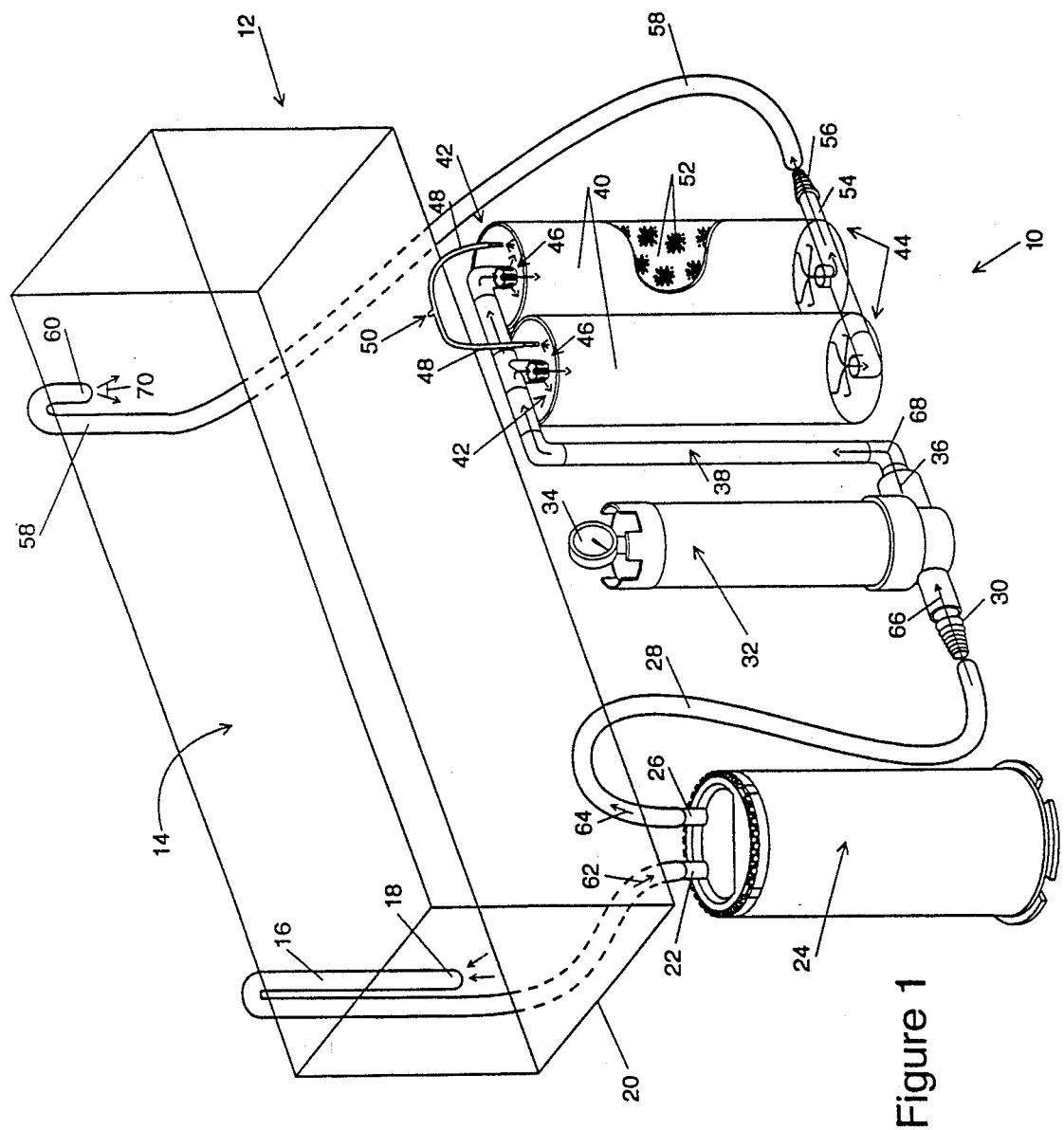
FIG. 1 is a diagrammatical perspective of the biological filtration system of the present invention used to filter the water supply of an aquarium.

Referring now to the drawings, FIG. 1 illustrates the biological filtration system 10 of the present invention. The filtration system 10 is used to filter water from a water supply such as water in an aquarium 12. Aquarium 12 holds a predetermined amount of water and typically includes an open top 14. Aquarium 12 is a closed water system, fresh water systems, brackish systems, or other. In other words, no fresh supply of water enters aquarium 12. Therefore, the closed environment of aquarium 12 provides a water supply which is likely to have high levels of ammonia due to the fish and other organic matter in the water. The biological filtration system 10 of the present invention works well in traditional marine aquarium systems, in reef systems, fresh water systems, brackish systems, or other systems.

It is understood that although the biological filtration system 10 of the present invention is illustrated for use with aquarium 12, that other water supplies may be filtered using the biological filtration system 10. For instance, the biological filtration system 10 of the present invention may be used to filter a municipal water supply or a water supply drawn from a well or reservoir. If larger volumes of water are filtered, the size of the components of biological filtration system 10 must be increased to handle the increased volume of water.

Referring to FIG. 1, a water intake tube 16 includes an inlet end 18 located near bottom surface 20 of aquarium 12. Therefore, intake tube 16 is likely to pick up organic and inorganic detritus which tends to settle near the bottom aquarium 12. Water intake tube 16 is coupled to an inlet 22 of a conventional canister filter 24. Illustratively, canister filter 24 is a Magnum TM canister filter available from Marineland. Other canister filters may be used such as a Fluval ® canister filter available from Hagen or a Eheim ® canister filter available from Eheim in Germany. Canister filter 24 typically has a combined pump and filter. Media of other types is optional in canister filter 24. Water from aquarium 12 is drawn through a filter media inside canister filter 24. Canister filter 24 therefore provides a prefilter for biological filtration system 10 of the present invention and also provides a pump for pumping water from aquarium 12 through biological filtration system 10 and back into aquarium 12. An outlet 26 from canister filter 24 is coupled to a first end of hose 28. An opposite end of hose 28 is coupled to a hose barb 30 which provides an inlet to micron filter 32 which is the first component of the biological filtration system 10.

Figure 2:
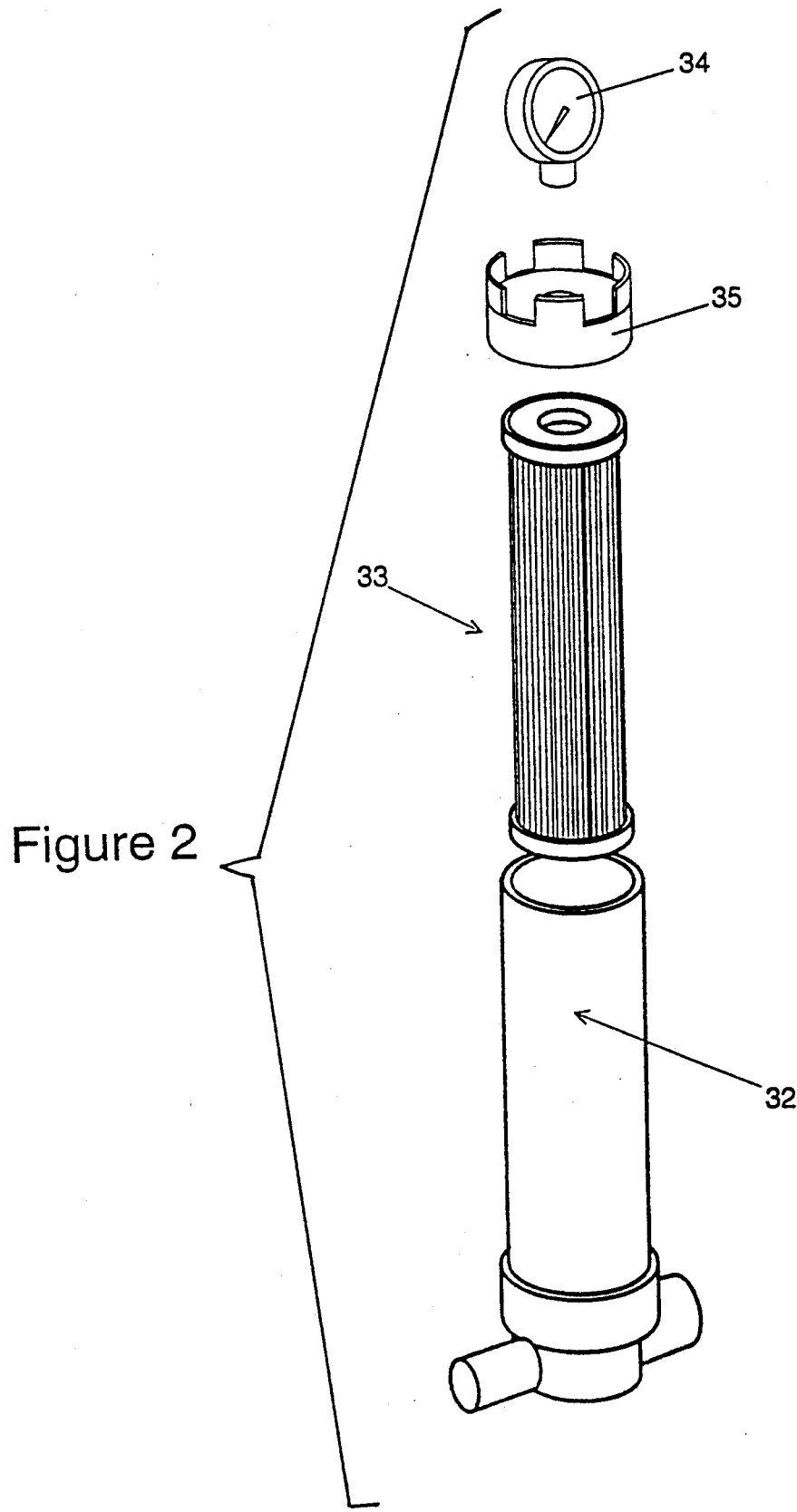
FIG. 2 is an exploded perspective view of a micron filter used in the present invention illustrating a removable micron filter cartridge.

Micron filter 32 is illustratively a Rainbow Lifeguard Micron filter available from Rainbow Lifeguard Aquarium Products, in El Monte, Calif. It is understood, however, that any brand or style of micron filter will work for the biological filtration system 10 of the present invention. A removable micron filter cartridge 33 illustrated in FIG. 2 is located within micron filter 32 to filter or trap particles and detritus. Heterotrophic bacteria feed on the available organic food supply provided by the trapped organic particles and organic detritus. A pressure gauge 34 may also be provided to indicate when the filter cartridge 33 is clogged and needs to be replaced. As discussed below, the entire filter cartridge 33 can be removed from micron filter 32 to remove the detritus and heterotrophic bacteria which are contained within the cartridge. End cap 35 is removable to permit cartridge 33 to be removed. Trapped detritus is removed to prevent further breakdown of organic matter by heterotrophic bacteria. Some heterotrophic bacteria colonies that increase the amount of ammonia in the water as the heterotrophic bacteria colonies break down organic matter are also removed from micron filter 32 when cartridge 33 is changed. This reduces the quantity of ammonia in the water supply.

Although the preferred embodiment includes a micron filter 32 which traps detritus or other particles having a size larger than one micron, it is understood that the filter range can vary from submicron to about 5 microns as long as a substantial portion of the organic detritus which provides a food supply for the heterotrophic bacteria are trapped by filter 32. However, the efficiency of the biological filtration system 10 will decrease as the pore size of filter 32 increases above 1 micron.

An outlet 36 of micron filter 32 is coupled to an arrangement of PVC pipes 38. PVC pipes 38 supply water from micron filter 32 to an array of canisters 40. At least one canister is used in accordance with the present invention. Depending on the size of the water supply to be filtered, two or more canisters 40 may be used. Canisters 40 include an inlet end 42 and an outlet end 44. A spray nozzle 46 is located adjacent the inlet end 42 of each canister 40. Spray nozzles 46 include a plurality of apertures which disperse water over a larger area inside inlet end 42 of canisters 40. Illustratively, spray nozzles 46 are generally round nozzles having a plurality of apertures which spray water radially outwardly from nozzles 46. An air supply hose 48 is also located adjacent the inlet end 42 of each canister 40. Air is supplied through air hose 48 from an air pump (not shown) in the direction of arrow 50 to supply the inlet end 42 of each canister 40 with air. A check valve (not shown) is included between the air pump and the inlet of air hose 48. An outer wall of each canister 40 is preferably completely opaque to reduce or eliminate light inside canisters 40. In addition, all lines and fittings are also preferably completely opaque. This reduces the supply of light which further reduces growth of heterotrophic bacteria in canisters 40.

The interior region of each canister 40 is filled with "bio balls" or biomedia 52. Preferably, each canister 40 is completely filled with biomedia 52. Biomedia 52 may be commercially available biomedia such as Theil Aquatech available from Theil Aqua Tech Inc. in Las Cruces, N. Mex. It is understood that any other biomedia may be used which has a large surface area on which nitrifying bacteria can grow.

An outlet end 44 of each canister 40 is coupled to an outlet pipe 54 having a hose barb 56. A first end of water outlet tube 58 is coupled to hose barb 56. A second end of water outlet tube 58 extends into the open area 14 of aquarium 12 so that the filtered water passes through outlet 60 and back into aquarium 12.

In operation, water inside aquarium 12 enters water intake tube 16 through inlet 18. Water passes in the direction of arrow 62 into inlet 22 of canister filter 24. Canister filter 24 prefilters the water and provides a pump for circulating water through filtration system. It is understood that another type of pump may be used with or without such a prefilter. In addition, siphon-type setup may provide enough water flow to circulate water through biological filtration system 10. In other words, canister filter 24 is not required for operation of the biological filtration system of the present invention.

Water passes through outlet 26 of canister filter 24 in direction of arrow 64. Water passes through hose 28 and into the inlet of micron filter 32 in the direction of arrow 66. Micron filter 32 traps detritus and heterotrophic bacteria larger than one micron inside filter cartridge 33. In other words, organic and inorganic particles, bacteria, or other detritus having a size larger than one micron are trapped in micron filter cartridge 33 of micron filter 32. Nitrifying bacteria pass micron filter 32 and grow on biomedia 52 inside canisters 40. Micron filter 32 provides an excellent environment for the heterotrophic bacteria colonies to grow since heterotrophic bacteria thrive on larger pieces of organic detritus. In other words, micron filter cartridge 33 holds the bulk of the organic material which is required for growth of heterotrophic bacteria colonies. Therefore, heterotrophic bacteria tends to grow or colonize mainly on the organic matter trapped in micron filter cartridge 33. This provides separate locations for the growth of heterotrophic bacteria on cartridge 33 and nitrifying bacteria on biomedia 52. After micron filter cartridge 33 becomes clogged, the cartridge 33 can be removed and replaced or cleaned. This removes a substantial portion of the organic material or detritus from the water supply which the heterotrophic bacteria break down into ammonia. Therefore, the level of ammonia in the water is reduced.

After being filtered by micron filter 32, water passes through outlet 36 in the direction of arrow 68. Water passes through PVC tubes 38, through spray nozzles 46, and into canisters 40. Spray nozzles 46 disperse the incoming water of a large surface area so that water passes substantially evenly over biomedia 52 in canisters 40 to reduce the likelihood of channeling. The dispersed water also mixes easily with air input from air pump 49 through air supply tubes 48. The biomedia 52 in canisters 40 has a large surface area to provide an excellent location for nitrifying bacteria to thrive. Both Nitrosomonas and Nitrobacter thrive inside canisters 40. By separating the location that heterotrophic bacteria and nitrifying bacteria exist and by supplying oxygen adjacent canisters 40, the filtration system 10 of the present invention provides an optimum environment for growth or nitrifying bacteria colonies, thereby improving the efficiency of the nitrification process. Air is injected at a location near the nitrifying bacteria. Therefore, needed oxygen is always delivered to the nitrifying bacteria on biomedia 52. Water exiting canisters 40 passes through tube 54 and outlet hose 58 and is returned to the aquarium 12 through water outlet 60 in the direction of arrows 70.

FIG. 3 illustrates a sample of the improved performance of the biological filtration system 10 of the present invention used to filter a 60 gallon marine tank. The tank contained about 32 inches of fish during the cycle and about 15 pounds of live rock. The water was tested at least once a day using Drytab TM chemical test available from Aquarium Pharmaceuticals. The water chemistry was not altered in any way until the 30th day of the cycle when a 30% water change occurred. All animals survived the cycle except for some of the more delicate inhabitants of the live rock. However, these portions of the live rock grew back as the water quality improved.

In FIG. 3, the ammonia concentration as illustrated by solid line 72. The nitrite is illustrated by dashed line 74. The nitrate level is illustrated by the dot-dashed line 76. As illustrated in FIG. 3, the ammonia peak occurred on the 8th day at about 1.0 part per million (ppm). This was followed by the nitrite peak on the 12th day which was also at about 1.0 ppm. Both the ammonia and the nitrate levels dropped to 0 ppm by day 19. On day 17, the nitrate level began rising and continued to rise until a partial water change occurred which dropped the nitrate level to 2 ppm. The results achieved by the biological filtration system 10 of the present invention are a substantial improvement over the results for conventional biological filters. The biological filtration system 10 of the present invention is able to limit the amount of ammonia and nitrite present in an aquarium while maintaining about three-times the standard biological load within the aquarium.

Although the invention has been described in detail with reference to a certain preferred embodiment, variations and modifications exist within the scope and spirit of the invention as described and defined in the following claims.

What is claimed is:

1. A biological filtration system for filtering a water supply, the filtration system comprising:
    a micron filter having an input and an output, said micron filter having a pore size range of from submicron to about 5 microns;
    means for supplying water from the water supply to the input of the micron filter so that the micron filter traps detritus and other organic material entrained in the water to promote growth of heterotrophic bacteria in the micron filter;
    a canister filled with a biomedia material said biomedia material defining a means for promoting growth of nitrifying bacteria in the canister, the canister having an inlet end coupled to the output of the micron filter and an outlet end;
    means for injecting air into the inlet end of the canister; and
    means for returning water from the outlet end of the canister to the water supply.

2. The filtration system of claim 1, further comprising a spray nozzle located adjacent the inlet end of the canister for spraying water into the inlet end of the canister, thereby dispersing the water entering the inlet end of the canister so that water flows substantially evenly over the biomedia inside the canister.

3. The filtration system of claim 1, wherein the canister is made from an opaque material.

4. The filtration system of claim 1, wherein the canister has a generally cylindrical shape.

5. The filtration system of claim 1, wherein an array of canisters is provided to increase the capacity of the filtration system.

6. A biological filtration system for filtering a water supply, the filtration system comprising:
    a micron filter having an input and an output, said micron filter having a pore size range of from submicron to about 5 microns;
    an elongated canister having an opaque outer wall defining an interior region which contains biomedia material therein, said biomedia material defining a means for promoting growth of nitrifying bacteria in the canister, the canister having an inlet end and an outlet end;
    means for supplying water from the water supply to the inlet end of the canister, the supplying water means being coupled to the input of the micron filter, and the output from the micron filter being coupled to the inlet end of the elongated canister, the supplying means including a spray nozzle located adjacent the inlet end of the canister for dispersing the water entering the inlet end of the canister so that water flows substantially evenly over the biomedia inside the canister;
    means for supplying air into the inlet end of the canister so that air mixes with the dispersed water from the spray nozzle; and
    means for returning water from the outlet end of the canister to the water supply.

7. A biological filtration system for filtering a water supply, the biological filtration system reducing the quantity of ammonia and nitrite in the water supply, the filtration system comprising:
    means for separating heterotrophic bacteria colonies, from nitrifying bacteria colonies, said separating means including a micron filter having an input and an output, said micron filter having a pore size range of from submicron to about 5 microns;
    means for supplying water from the water supply to the separating means;
    a canister filled with a biomedia material, said biomedia material defining a means for promoting growth of nitrifying bacteria in the canister, the canister having an inlet end coupled to the outlet of the separating means so that water from the separating means flows through the canister and an outlet end;
    means for injecting air into the inlet end of the canister to provide oxygen for promoting oxidation of ammonia and nitrite by the nitrifying bacteria growing on the biomedia in the canister; and means for returning water from the outlet end of the canister to the water supply.

8. The filtration system of claim 7, wherein the micron filter includes a removable micron filter cartridge so that the detritus and heterotrophic bacteria trapped in the micron filter cartridge is removed from the water supply, thereby reducing the content of heterotrophic bacteria in the water supply.

9. The filtration system of claim 10, further comprising a spray nozzle located adjacent the inlet end of the canister for spraying water into the inlet end of the canister, thereby dispersing the water entering the inlet end of the canister so that water flows substantially evenly over the biomedia inside the canister.

10. The filtration system of claim 10, wherein the canister is made from an opaque material.

11. The filtration system of claim 10, further comprising means for removing heterotrophic bacteria from the water supply to reduce the supply of ammonia in the water supply.

* * * * *